May 31, 1932.  J. N. PRENTIS  1,861,028
EMERGENCY BRAKE HOOK-UP
Filed April 13, 1929
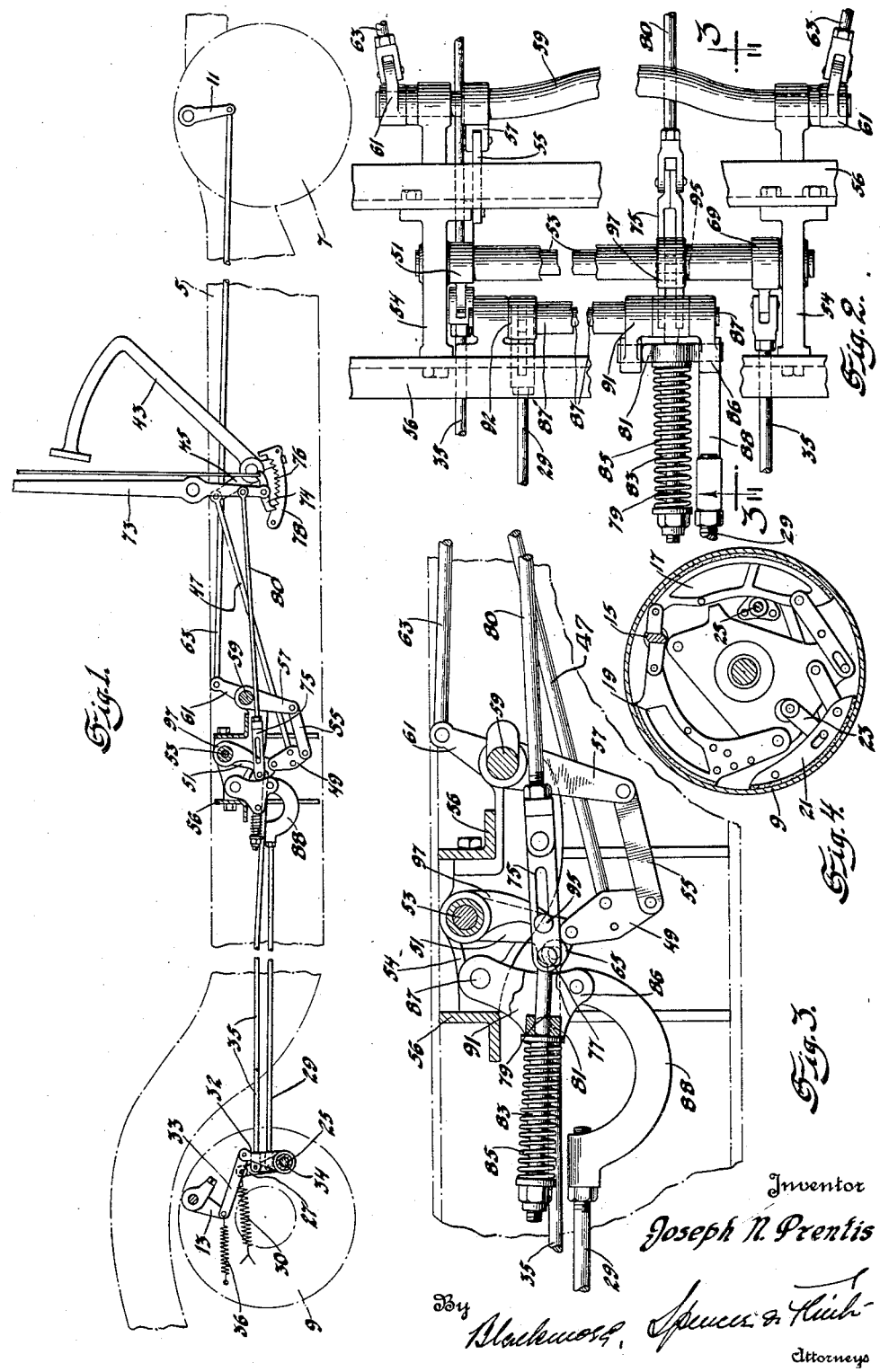
Inventor
Joseph N. Prentis
By
Attorneys Patented May 31, 1932

1,861,028

UNITED STATES PATENT OFFICE

JOSEPH N. PRENTIS, OF DETROIT, MICHIGAN, ASSIGNOR TO GENERAL MOTORS CORPORATION, OF DETROIT, MICHIGAN, A CORPORATION OF DELAWARE

EMERGENCY BRAKE HOOK-UP

Application filed April 13, 1929. Serial No. 354,814.

This invention relates to brake operating means, and particularly to mechanism for operating both service brakes and emergency brakes on the vehicles.

An object of the invention is to make use of service brake shoes engaging drums on all four wheels, and additional emergency shoes engaging the drums on the rear wheels.

More specifically, there is designed brake operating means for rendering active the said service brakes on all four wheels, and independent operating mechanism for rendering active the emergency shoes associated with the rear wheel drums, together with a connection between the service brake operating means and the emergency brake operating means, whereby the emergency brake operating mechanism shall operate additionally the service brakes of the rear wheels to the end that the emergency or parking brake, applicable to the rear wheels only, nevertheless shall be very efficient and require but light manual pressure.

Another object of the invention is to so construct the brake hook up that the vehicle may be efficiently checked, even in the event of the breakage of some of the operating parts.

Other objects and advantages will be understood from the following description taken in connection with the accompanying drawings.

In the drawings:

Figure 1 is a longitudinal section through the chassis showing the operating parts in elevation;

Figure 2 is a plan view of a portion of the brake hook-up;

Figure 3 is a view looking in the direction indicated by the arrows of Figure 2;

Figure 4 is a section through a drum associated with one of the rear wheels.

Referring by reference characters to the drawings, numeral 5 represents a part of the chassis frame. Numeral 7 designates one of the front wheel brake drums, and 9 represents a brake drum for a rear wheel. Numeral 11 is a lever arm, the rotation of which operates front wheel brakes within the drum. These brakes may be of any preferred form, or they may correspond to the service brakes as shown in Figure 4. At 13 is a lever arm associated with the brake on one of the rear wheels. The shaft to which this lever arm is connected carries a cam 15 as shown in Figure 4. This cam, as it rotates, expands shoes 17 and 19 into frictional engagement with the drum. Between shoes 17 and 19 is an emergency shoe 21 actuated by a link 23 which is moved by an eccentric associated with shaft 25. This shaft 25 extends inwardly from the wheel in a direction substantially parallel with the axle, and is provided with an arm 27 to which is connected a rod 29. At the upper end of arm 27 there is a spring 30 which may be anchored at any convenient fixed part, the function of the spring being to release the emergency brake.

Arm 13, which is connected with the shaft carrying the cam for actuating the service brake, is connected by a link 33 with an arm 32 carried by a second rock shaft, also parallel with the rear axle. The second shaft may, and preferably is, tubular and concentric with shaft 25, and is represented by numeral 34. This tubular shaft is provided with a second arm which is located adjacent arm 27, as shown in Figure 1, and is connected for brake operation with a rod 35. A releasing spring 36 is connected in any convenient way with the service brake mechanism. A similar system of operating mechanism is used with each rear wheel brake.

Numeral 43 represents the pedal which is used for applying the service brakes. From an arm 45 on this pedal a rod 47 extends and connects the pedal with an intermediate point of an equalizer 49. At its upper end equalizer 49 is pivoted to an arm 51, rigid with the rear brake rock shaft 53, suitably journalled in members 54 carried by cross frame members 56.

The lower end of equalizer 49 is connected by a link 55 to an arm 57 on a front brake rock shaft 59. The latter has arms 61 at each end, whch arms are connected by links 63 to the lever arms 11 at the front wheel brakes. Arm 51 is connected as at 65 to a rod 35 which latter is connected to the aforesaid operating arm of one of the rock shafts 34. At the other end of shaft 53 is a lever arm 69 connected by another rod 35 to a corresponding arm on the similar brake shaft at the other rear wheel.

It will be seen from the above description that when the pedal 43 is depressed it operates through the equalizer to rock shafts 53 and 59, the latter of which functions to apply the front wheel brakes, and the former of which operates to apply the rear wheel brakes.

The emergency brake system is concerned with the shoes 21 which are similarly brought into frictional engagement with the drums of the rear wheels. The emergency shoes are actuated by lever 73, the lever being provided with a pawl 74 to engage teeth 76 of a conventional segment 78. The lever acts through the instrumentality of a rod 80. The rod is pivotally connected at its rear end to a slotted yoke 75, the purpose of this slotted yoke being explained below. The rear end of the yoke is pivoted at 77 to a rod 79. This rod 79 extends through an opening in an equalizer 81. A sleeve 83 and a spring 85 surround the rod 79 and engage the equalizer. The outermost abutment for spring 85 consists of a washer and nut carried by rod 79 and clearly illustrated in Figures 2 and 3. Equalizer 81 is pivotally trunnioned to an arm 86 rotatably mounted on a shaft 87. The arm 86, at its lower end, is pivoted to a connector 88 to the rear end of which is secured the rod 29 for rocking the shaft 25. The part 81 is also on its other side trunnioned to an arm 91 rigidly secured to sleeve 87'. Sleeve 87' also has an arm 92 to which is connected the other rod 29 for the emergency brake at the other rear wheel.

It will thus be seen that upon the actuation of the emergency lever 73, the rod 80 operates to apply the two service shoes 21 on the rear wheel drums.

The yoke 75 is slotted, and a pin 95 on an arm 97 of shaft 53 is movable in the slot of the yoke when the service brake is applied so that the actuation of the service brake does not interfere with the emergency brake operating mechanism. On the other hand, when the lever 73 is used to actuate the emergency brake it acts positively through pin 95 and arm 97 to apply the service shoes 17 and 19 of the rear brake, in addition to resiliently applying the emergency shoes 21 through the action of spring 85. If desired, the sleeve 83 may be used so that after a limited resilient operation the action upon the emergency shoes may become positive.

If in operation the service pedal is actuated it applies all the service brake shoes. Pin 95 moves forwardly in the slot of yoke 75 preventing any interference with the normal release position of the emergency brake operating mechanism. If, after the service brake is fully applied, the emergency lever is actuated, it applies the emergency shoes 21 to the rear brakes. The lever may be further moved after pin 95 engages the rear end of the slot so that additional pressure may be given the rear service shoes. Should the emergency brake linkage to the rear of yoke 75 fail, the emergency lever is still effective upon the service shoes in the rear wheel drums. Should one of the rods 35 fail the other rear brake is operative. Should both connections between shaft 53 and the rear brakes fail the engagement of the arms of shaft 53 with the cross frame member anchors the upper pivot of equalizer 49 and permits the operation of the front brakes. Since the emergency lever operates upon nearly the whole drum periphery it has no tendency to distort the drum.

The above advantages are accomplished by structure which is comparatively simple and not expensive.

I claim:

1. In combination, a vehicle having front wheels and rear wheels, internal brakes associated with each of said wheels, operating means for applying said brakes, other internal brakes associated with said rear wheels, operating mechanism to apply said other brakes, connecting means between said means and mechanism whereby said mechanism applies said other brakes and also applies those of the first mentioned brakes associated with the rear wheels by connections independent of the connection between said mechanism and said other brakes.

2. In combination, a vehicle having front wheels and rear wheels, brakes associated with each wheel, a rock shaft for the front wheel brakes, a rock shaft for the rear wheel brakes, an equalizer operable between said rock shafts, a lever operable upon said equalizer to apply said brakes, other brakes associated with the rear wheels, mechanism to apply said other brakes, said mechanism including a second lever and a rod, said rod also having a lost motion connection with an arm rigid with said rock shaft for the rear brakes whereby the second lever operates all the brakes associated with the rear wheels.

3. The invention set forth in claim 2, said rod having a resilient connection with said other brakes and a lost motion connection with the rock shaft for the rear wheel brakes.

In testimony whereof I affix my signature.

JOSEPH N. PRENTIS.